UNITED STATES PATENT OFFICE.

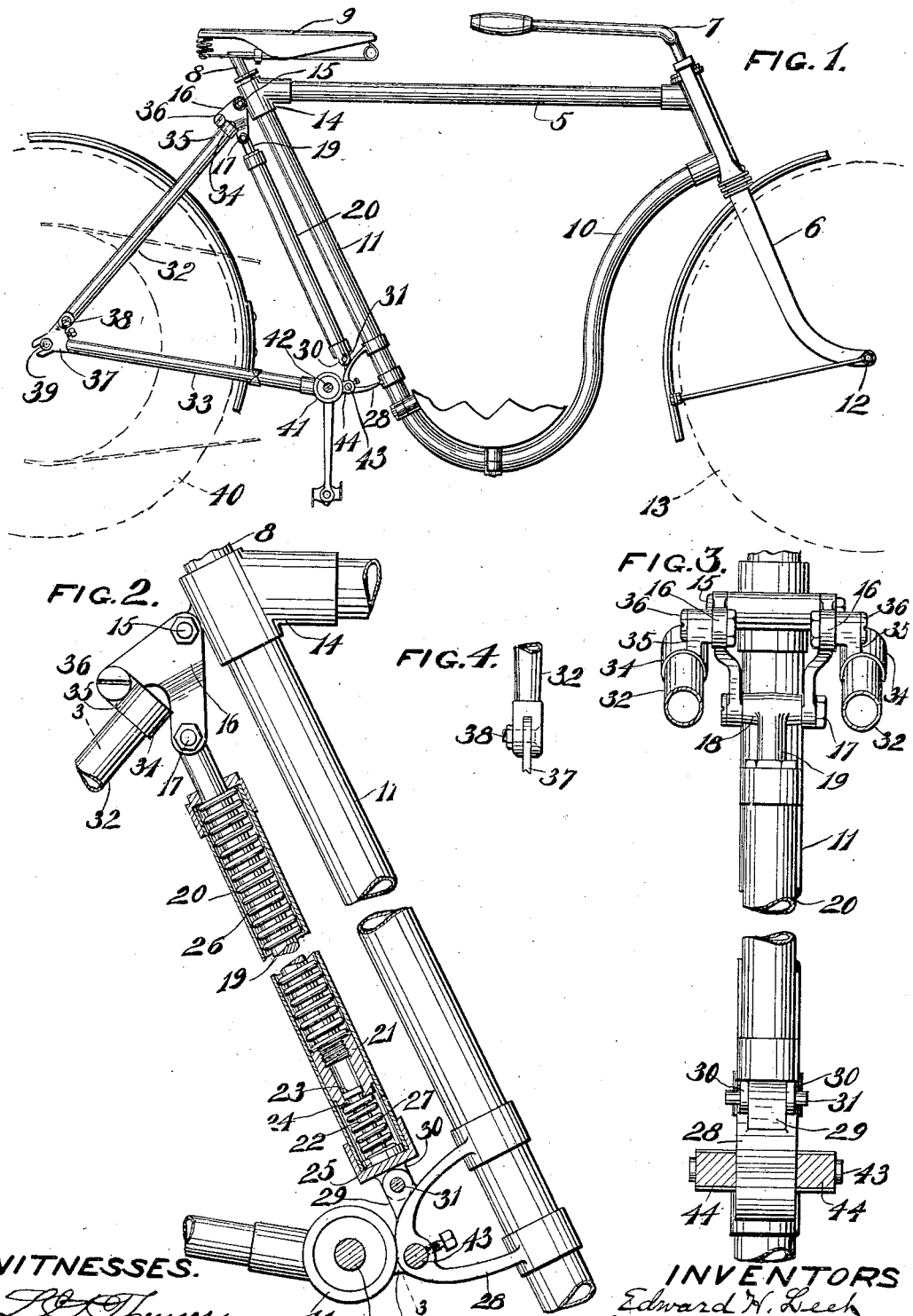

EDWARD H. LEET AND JULIUS E. STOLL, OF MILWAUKEE, WISCONSIN.

FRAME FOR MOTOR-CYCLES, BICYCLES, AND THE LIKE.

944,795.  Specification of Letters Patent.  Patented Dec. 28, 1909.

Application filed August 21, 1908. Serial No. 449,624.

*To all whom it may concern:*

Be it known that we, EDWARD H. LEET and JULIUS E. STOLL, residing in Milwaukee, in the county of Milwaukee and State of Wisconsin, have invented new and useful Improvements in Frames for Motor-Cycles, Bicycles, and the Like, of which the following is a description, reference being had to the accompanying drawings, which are a part of this specification.

Our invention relates to improvements in frames for motor cycles, bicycles, and the like.

The primary object of the invention is to provide a spring frame of such construction that all shocks and concussions in riding over rough or uneven roads are compensated for or cushioned, and thereby an easy riding and comfortable structure provided which is free from all shocks or jars.

With the above primary object, and other incidental objects, in view, the invention consists of the devices and parts, or their equivalents, as hereinafter set forth.

In the accompanying drawing, Figure 1 is a side elevation of a motor cycle frame, only a portion of the engine casing being shown; Fig. 2 is a side view of a portion of the frame, parts broken away and parts in section; Fig. 3 is a section on the line 3—3 of Fig. 2, looking toward the front of the machine, the tube 20 being broken away; and Fig. 4 is a detail of one of the pivotal connections for the rear axle.

The accompanying drawing illustrates the invention as applied to a motor cycle frame, consisting of the upper horizontal tube 5, the front fork 6, the steering handle 7, the seat post and seat 8 and 9 respectively, the drop frame comprising the front and rear tubes 10 and 11 respectively which join each other in a curved lower portion, and the rear frame portion hereinafter specifically referred to, and all as clearly shown in Fig. 1.

The lower ends of the furcate arms of the front fork form bearings for the front axle 12 carrying the front wheel 13.

The upper end of the rear tube 11 and the rear end of the upper horizontal tube 5 are connected by a coupling sleeve 14, and to the rear side of the rear member of this sleeve is pivoted, on a pivot pin 15, two bell-crank levers 16, 16. The lower ends of the lower arms of these bell-crank levers are connected by means of a transverse pin 17, and on this pin is mounted, between the arms of the bell-crank levers, a sleeve 18 formed at the upper end of a piston stem 19. This stem enters a tube 20, the lower end of the stem terminating short of the lower end of the tube and being provided with a tubular piston 21, said piston preferably being detachably secured to the lower end of the stem by means of a threaded connection. A short plunger 22 is disposed in the lower portion of the tube 20. The upper enlarged end or head 23 of this plunger fits within the lower end of the bore of the piston 21, said piston being formed with an annular shoulder 24 which engages beneath the plunger head 23, and therefore when the piston moves upwardly the plunger is carried therewith. The plunger stem projects rigidly from a plate 25 which is normally seated loosely in the lower end of the tube 20.

Within the tube 20 and surrounding the piston stem 19 is a coiled spring 26. The upper end of this coiled spring bears against the upper end of the tube 20, and the lower end of said spring bears against the upper end of the piston 21. The plunger stem 22 is also surrounded by a coiled spring 27, as clearly shown in Fig. 2.

Secured to the tube 11 and extending rearwardly therefrom is a yoke 28. The upper arm of this yoke is provided with an upwardly extending lug 29 which fits between two ears 30, 30 extending downwardly from the lower end of the tube 20. The said lug and the said ears are connected by means of a pin 31, thereby providing a pivotal connection between the lower end of the tube 20 and the said yoke 28.

It will be noted that the pivot pin 15, the transverse pin 17 and the pin 31 are substantially in alinement in order to cause the movement of the frame to gradually decrease and finally come to its normal position without a jolt in riding over an obstruction, and in striking an obstruction, to yield slowly at first and then permit a gradually increasing rate of movement, thus reducing the jolts and shocks to a minimum.

The rear frame portion of the machine consists of two upper diagonal tubes 32, 32, and the lower substantially horizontal tubes 33, 33. The upper ends of the diagonal tubes 32 are equipped with sleeves 34, 34, and from these sleeves project ears 35, 35, said ears being pivotally mounted on trunnions or pivots 36, 36 extending laterally from the upper arms of the bell-crank levers 16. The lower end of each tube 32 is flattened and bifurcated, as shown in detail in Fig. 4. Projections from the bearing plates 37 for the rear axle extend between the furcate members at the lower ends of the tubes 32, and are pivotally connected thereto by means of pivot pins 38. The bearing plates 37 are of the usual construction, i. e., provided with bifurcated rear ends which straddle or receive therein the ends of the rear axle 39 carrying the rear wheel 40.

The rear ends of the lower rear tubes 33 are rigidly connected to the bearing plates 37 and extend forwardly therefrom, the forward ends thereof tightly fitting in sockets projecting from the casing or box 41 for the crank axle 42. The crank axle box is pivotally connected to the yoke 28 through the medium of a pivot pin 43 passing through the yoke and through lugs 44, 44 extending from the crank case and straddling the yoke.

In the use of the invention, if, for instance, the front wheel should strike an obstruction and the front portion of the frame thereby lifted, the frame would be thrown at a rearward incline and a jar imparted to the rider, were it not for the provision of the spring cushioning means herein provided. When an obstruction is met with as just referred to, the horizontality of the frame is preserved by reason of the fact that the bell-crank levers 16 turn in a direction to throw upwardly the lower arms of said levers and thereby raise the piston stem 19 and the piston 21 at the lower end of said stem, this raising taking place against the action of the coiled spring 20, and which spring of course is thereby compressed. In this manner, and as will be obvious, the rear portion of the frame is raised correspondingly to the front portion. With the raising of the piston 21 the plunger 22—23 is carried upwardly therewith by reason of the engagement of the annular shoulder 24 with the plunger head. When the front wheel passes over the obstruction and the front portion of the frame thereby lowered, the bell-crank levers turn in the opposite direction, that is to say, the lower arms of said bell-crank are lowered and the piston thereby lowered. This lowering of the piston is assisted by the recoil of the spring 26. The plunger 22—23 also lowers at the same time, the bottom plate 25 thereof finally seating itself in the bottom of the tube 20. If in the lowering of the piston the action of the bell-crank levers and of the spring should cause the piston head to lower beyond its normal position shown in Fig. 1, such excess movement is against the action of the spring 27 surrounding the plunger stem. This spring on subsequently recoiling returns the piston to normal position.

If instead of the front wheel passing over the obstruction it should pass into a rut or depression, the reverse operation to that first explained occurs, that is to say, the piston lowers in its tube 25 and thereby lowers the rear portion of the frame to correspond to the lowered position of the front portion thereof.

In the case of the rear wheel striking an obstruction or elevation, or passing into a rut or depression, the frame is cushioned and likewise adjusted to a horizontal position in exactly the same manner as pointed out with reference to the front wheel.

The bell-crank levers 16 of course swing in the arc of a circle on their pivots in order to reduce the vibration by permitting the movements of the parts to start and finish at gradually increased and diminished rates of movement. To permit of this swinging it is of course necessary that the pivot 17 at the upper end of the piston stem 19, and the pivot 31 at the lower end of the tube 20 be provided. For the same reason, the pivots 35, 38 and 42 are necessary.

The tube 20 hereinbefore referred to is preferably filled with oil or vaseline, which oil or vaseline in the return movement of the piston acts as a shock absorber.

The application of our invention to a bicycle frame will be obvious. The bicycle frame differs in construction but slightly from the motor cycle frame, and the improved construction is applied, in the case of a bicycle frame in exactly the same manner, as illustrated in the accompanying drawing, that is to say, the spring cushioning device will be located just to the rear of the rear upright post of the front portion of the frame.

What we claim as our invention is:

1. In a frame for motor cycles, bicycles, and the like, the combination of a forward frame portion and a rear frame portion, pivotal connections between upper and lower points of said frame portions, a bell crank lever forming part of the upper connection, a piston stem pivotally connected to the lower arm of said lever, said stem provided at its lower end with a piston, a tube into which the piston stem passes and in which the piston reciprocates, a pivotal connection between the lower end of said tube and the frame, and a coiled spring within the tube and surrounding the piston stem between the piston and the upper end of the tube.

2. In a frame for motor cycles, bicycles, and the like, the combination of a forward frame portion and a rear frame portion, a member connecting the upper and lower points of said frame portions, a piston stem pivotally connected to the lower portion of said member, said stem provided at its lower end with a tubular piston, a tube into which the piston stem passes and in which the piston stem reciprocates, a coiled spring surrounding the piston stem between the piston and the upper end of the tube, a plunger in the lower portion of the tube and having its head movable in the bore of the tubular piston, the lower end of the piston engaging beneath said plunger head so as to carry the plunger upwardly therewith, a coiled spring surrounding the depending stem of the plunger, and a pivotal connection between the lower end of the tube and the frame.

3. In a frame for motor cycles, bicycles, and the like, the combination of a front frame portion, a bell-crank lever pivoted to the upper end of the rear upright post of the front frame portion, a piston stem pivotally connected to the lower arm of the bell-crank lever, said stem provided at its lower end with a piston, a tube into which the piston stem passes and in which the piston reciprocates, a coiled spring within the tube and surrounding the piston stem between the piston and the upper end of the tube, a member projecting from the rear post of the forward frame portion and to which member the lower end of the tube is pivoted, and a rear frame portion having the forward ends of the lower tube members thereof pivotally connected to a lower point of the forward frame portion, and its upper tube members pivotally connected at their forward ends to the upper arm of the bell-crank lever and at their rear ends to the bearing for the rear axle.

4. A frame for motor cycles, bicycles, and the like, comprising a forward frame portion consisting of a steering head and a seat post tube suitably connected together, a lower rear frame member pivotally connected to the seat post tube, an upper rear frame member pivotally connected to the rear end of the lower frame member, a lever member pivotally connected to the upper portion of the seat post tube and having its rear portions connected to the upper portion of the upper rear member, a cylinder pivotally connected to the lower portion of the seat post tube, a piston stem positioned in the cylinder and pivotally connected to the lower portion of the lever member at a point substantially in alinement with the pivotal connections of the lever member and the cylinder to the seat post tube, and a yielding means within the cylinder and interposed between one portion of the piston stem and the upper end of the cylinder and having a tendency to move the piston stem toward the lower end of the cylinder to hold the pivotal connections substantially in alinement.

5. A frame for motor cycles, bicycles, and the like, comprising a forward frame portion consisting of a steering head and a seat post tube suitably connected together, a lower rear frame member pivotally connected to the seat post tube, an upper rear frame member pivotally connected to the rear end of the lower frame member, a lever member pivotally connected to the upper portion of the seat post tube and having its rear portion connected to the upper portion of the upper rear member, a cylinder pivotally connected to the lower portion of the seat post tube, a piston positioned within the cylinder and having its stem pivotally connected to the lower portion of the lever member at a point substantially in alinement with the pivotal connections of the lever member and the cylinder to the seat post tube, and a coiled spring interposed between the piston and the upper end of the cylinder and tending to move the piston toward the lower end of the cylinder to hold the pivotal connections substantially in alinement.

6. A frame for motor cycles, bicycles, and the like, comprising a forward frame portion consisting of a steering head and a seat post tube suitably connected together, a lower rear frame member pivotally connected to the seat post tube, an upper rear frame member pivotally connected to the rear end of the lower frame member, a lever member pivotally connected to the upper portion of the seat post tube and having its rear portion connected to the upper portion of the upper rear member, a cylinder pivotally connected to the lower portion of the seat post tube, a tubular piston positioned within the cylinder and having its stem pivotally connected to the lower portion of the lever member at a point substantially in alinement with the pivotal connections of the lever member and the cylinder to the seat post tube, a plunger having a head on its lower end extending into the opening of the piston and adapted to be carried thereby, a coiled spring interposed between the piston and the plunger head, and a coiled spring interposed between the piston and the upper end of the cylinder and tending to move the piston toward the lower end of the cylinder to hold the last mentioned pivotal connections substantially in alinement.

7. A frame for motor cycles, bicycles, and the like, comprising a forward frame portion consisting of a steering head and a seat post tube suitably connected together, a projecting member extending rearwardly from the lower portion of the seat post tube, a lower rear frame member pivotally connected to the projecting member, an upper rear frame member pivotally connected to the rear end of the lower frame member, a bell crank lever pivotally connected to the upper portion of the seat post tube and having its upper arm connected to the upper portion of the upper rear member, a cylinder pivotally connected to the projecting member, a piston stem positioned in the cylinder and pivotally connected to the lower arm of the bell crank lever at a point substantially in alinement with the pivotal connections of the bell crank lever to the seat post tube and the cylinder to the projecting member, a tubular piston provided with a shouldered portion positioned within the cylinder and connected to the stem, a plunger having a head on its upper and lower ends positioned partly within the tubular piston with its upper head engaged by the shouldered portion of the piston and adapted to be carried thereby, a coiled spring surrounding said plunger and interposed between the lower head and the piston, and a coiled spring surrounding the piston stem and interposed between the piston and the upper end of the cylinder and tending to move the piston toward the lower end of the cylinder to hold the last mentioned pivotal connections substantially in alinement.

In testimony whereof, we affix our signatures, in presence of two witnesses.

EDWARD H. LEET.
JULIUS E. STOLL.

Witnesses:
C. H. KEENEY,
ALMA A. KLUG.